US008965646B2

(12) United States Patent
Cuogo

(10) Patent No.: US 8,965,646 B2
(45) Date of Patent: Feb. 24, 2015

(54) CONTROL SYSTEM AND METHOD FOR THE TRANSMISSION OF A VEHICLE

(75) Inventor: Luca Cuogo, Zero Branco (IT)

(73) Assignee: Carraro Drive Tech S.p.A., Campodarsego (PD) (IT)

( * ) Notice: Subject to any disclaimer, the term of this patent is extended or adjusted under 35 U.S.C. 154(b) by 44 days.

(21) Appl. No.: 13/823,074

(22) PCT Filed: Sep. 12, 2011

(86) PCT No.: PCT/IB2011/053980
§ 371 (c)(1),
(2), (4) Date: Mar. 13, 2013

(87) PCT Pub. No.: WO2012/035485
PCT Pub. Date: Mar. 22, 2012

(65) Prior Publication Data
US 2013/0184950 A1     Jul. 18, 2013

(30) Foreign Application Priority Data

Sep. 13, 2010   (IT) .............................. PD2010A0273

(51) Int. Cl.
*F16H 61/38* (2006.01)
*F16H 61/68* (2006.01)
*F16D 48/06* (2006.01)

(52) U.S. Cl.
CPC .............. *F16H 61/68* (2013.01); *F16D 48/066* (2013.01); *F16D 2500/1026* (2013.01); *F16D 2500/10412* (2013.01); *F16D 2500/1045* (2013.01); *F16D 2500/111* (2013.01); *F16D 2500/1112* (2013.01); *F16D 2500/30405* (2013.01); *F16D 2500/3051* (2013.01); *F16D 2500/30803* (2013.01); *F16D 2500/30816* (2013.01); *F16D 2500/31413* (2013.01);

(Continued)

(58) Field of Classification Search
USPC ........................................... 701/58; 192/3.57
See application file for complete search history.

(56) References Cited

U.S. PATENT DOCUMENTS

2003/0134713 A1   7/2003   Senger et al.
2007/0175720 A1 * 8/2007   Yoshida et al. .............. 192/3.63

FOREIGN PATENT DOCUMENTS

| DE | 102004023581 | 12/2005 |
| DE | 102005026615 | 12/2006 |
| EP | 1816376 | 8/2007 |
| WO | 2005005703 | 1/2005 |
| WO | 2005057039 | 6/2005 |
| WO | 2006100399 | 9/2006 |

(Continued)

*Primary Examiner* — Mary Cheung
*Assistant Examiner* — Yuen Wong
(74) *Attorney, Agent, or Firm* — Stites & Harbison PLLC; Nicolo Davidson

(57) ABSTRACT

A control system for the transmission of an agricultural vehicle or an industrial off-highway vehicle, wherein the system comprises a controller of the clutch, connected thereto to supply an operating signal, a plurality of sensors suitable for measuring a plurality of characteristic quantities of the transmission and connected to the controller to supply a plurality of signals proportional to the quantities, a torque processor suitable for calculating a reference torque and connected to the controller to supply thereto a signal proportional to the reference torque, and a thermal load managing device suitable for receiving at least some of the plurality of quantities and for receiving the reference torque in order to calculate at least one operative datum on which the thermal power exchanged in the clutch is dependent. The control system is suited to process the operative datum to operate the transmission so as to limit the temperature in the clutch.

14 Claims, 6 Drawing Sheets

Figure 1:
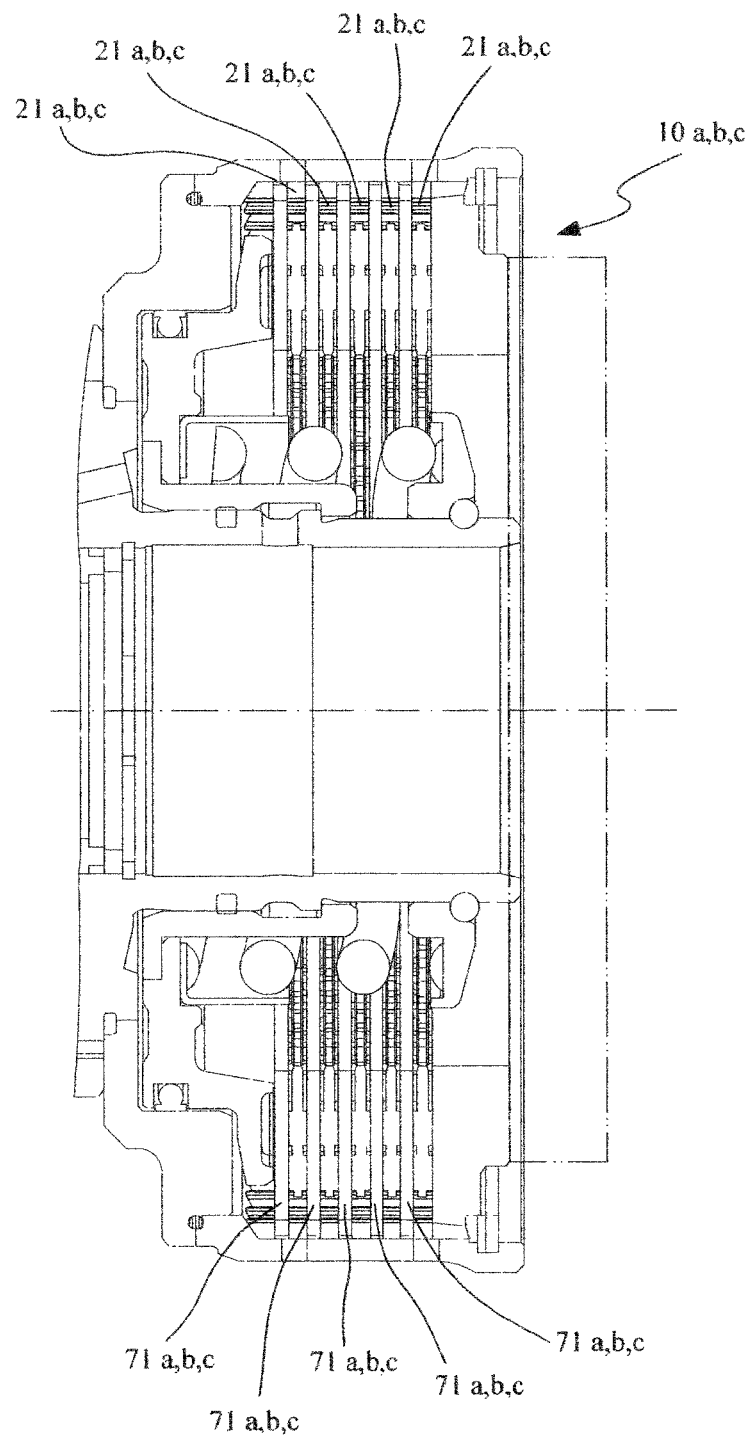

(52) U.S. Cl.
CPC ............. *F16D 2500/70252* (2013.01); *F16D 2500/70288* (2013.01); *F16D 2500/7043* (2013.01); *F16D 2500/70436* (2013.01); *F16D 2500/70448* (2013.01); *F16D 2500/70472* (2013.01)
USPC ............................................. 701/58; 192/3.57

(56) References Cited

FOREIGN PATENT DOCUMENTS

| | | |
|---|---|---|
| WO | 2006131268 | 12/2006 |
| WO | 2010097244 | 9/2010 |

\* cited by examiner

CONTROL SYSTEM AND METHOD FOR THE TRANSMISSION OF A VEHICLE

The invention relates to a control system for a transmission of an agricultural vehicle or an industrial off-highway vehicle, including the features mentioned in the preamble of the main claim, and to a control method for a transmission of an agricultural vehicle or an industrial off-highway vehicle.

Industrial off-highway vehicles are to be understood as being construction vehicles, such as earth-moving machines, grabs or the like, and other industrial vehicles intended for the transport of materials mainly off asphalted roads, for example vehicles for handling material inside warehouses. Industrial vehicles for the on-highway transport of items, such as lorries, road trains, road tractors and the like, are excluded.

In the context of agricultural vehicles and industrial off-highway vehicles, it is known to produce transmissions for vehicles comprising a clutch unit interposed between the motor and the gear-box or, according to other uses, placed downstream of the gear-box.

It is also known in that context to produce clutch units having one or more multi-plate clutches actuated by means of a hydraulic circuit controlled by a control system having a logic architecture including one or more controllers, for example, three controllers for three respective clutches.

Each of the controllers has identical operation, receiving as the main input signal a torque reference and sending as an output signal a pressure reference for the clutch-actuating hydraulic circuit.

In transmissions for agricultural vehicles, the torque reference is calculated by the control system as a function of a first input torque, set by the user by acting on the clutch pedal, and a second torque, identified on the basis of pre-set reference torque ramps and the actual working conditions of the clutch and the vehicle.

Typically, the control system chooses as the torque reference to be sent to the clutch controller the lower torque of the first and second input torques. Other input signals which may be used in the known controllers are the input and/or output speed of the clutch unit, the temperature and the pressure of the oil in the hydraulic actuating and lubricating circuit, the vehicle speed, the commands of the operator, the current circulating in the solenoid of a proportional valve which controls the pressure in the hydraulic clutch-actuating circuit.

Examples of clutch control systems are described, for example, in the patent applications WO 2006/100399, WO 2006/131268, US 2003/134713, DE 10 2004 023581 and WO 2005/05703.

The main disadvantage of those solutions is the fact that, in particular in the case of especially difficult practical conditions, they are not always capable of ensuring efficient containment of the temperature reached by the clutch plates owing to the thermal power generated by the clutch plates through friction in the slipping condition.

Furthermore, in those known control systems, the reduction in the temperature is generally associated with a decrease in the performance of the clutch, whereas it would be desirable to use that transmission device at the maximum possible performance, at the same time avoiding phenomena of excessive wear caused by excessively high temperatures.

The object of the invention is to provide a control system for a transmission of an agricultural vehicle or an industrial off-highway vehicle which is configured structurally and functionally to avoid those disadvantages. A further object is to provide a control method for a transmission of an agricultural vehicle or an industrial off-highway vehicle which is likewise configured functionally to avoid that disadvantage.

Those and other objects which will emerge more clearly hereinafter are dealt with and achieved by the invention by means of a system and a method in accordance with the claims which follow.

Figure 2:
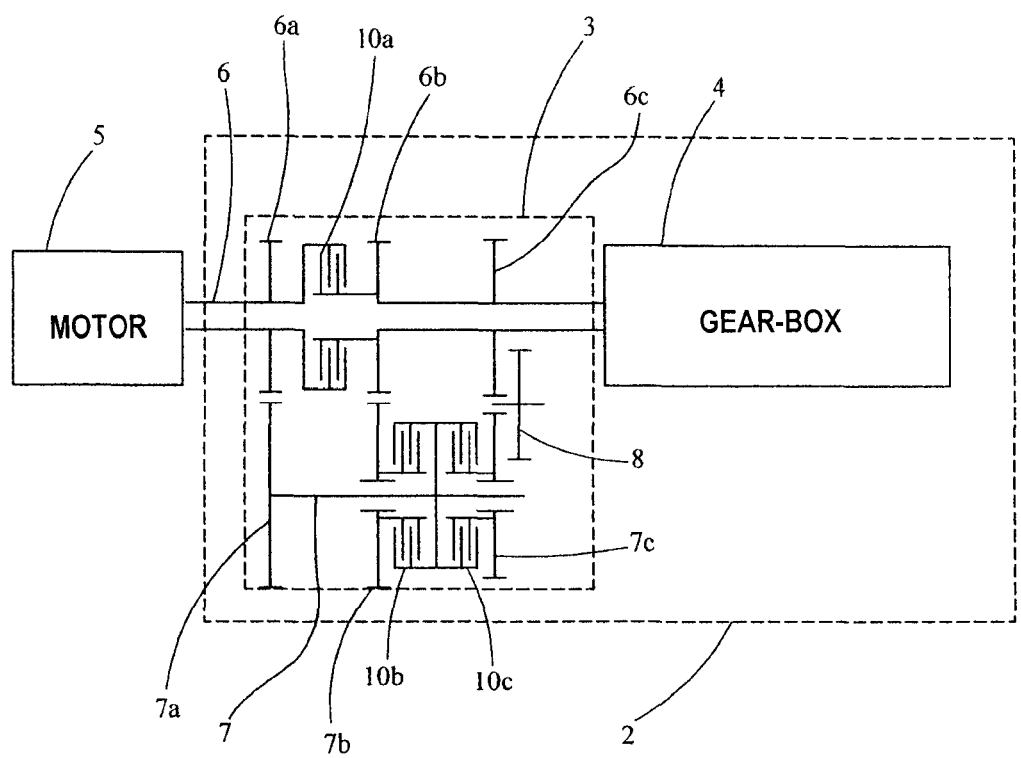
Figure 3:
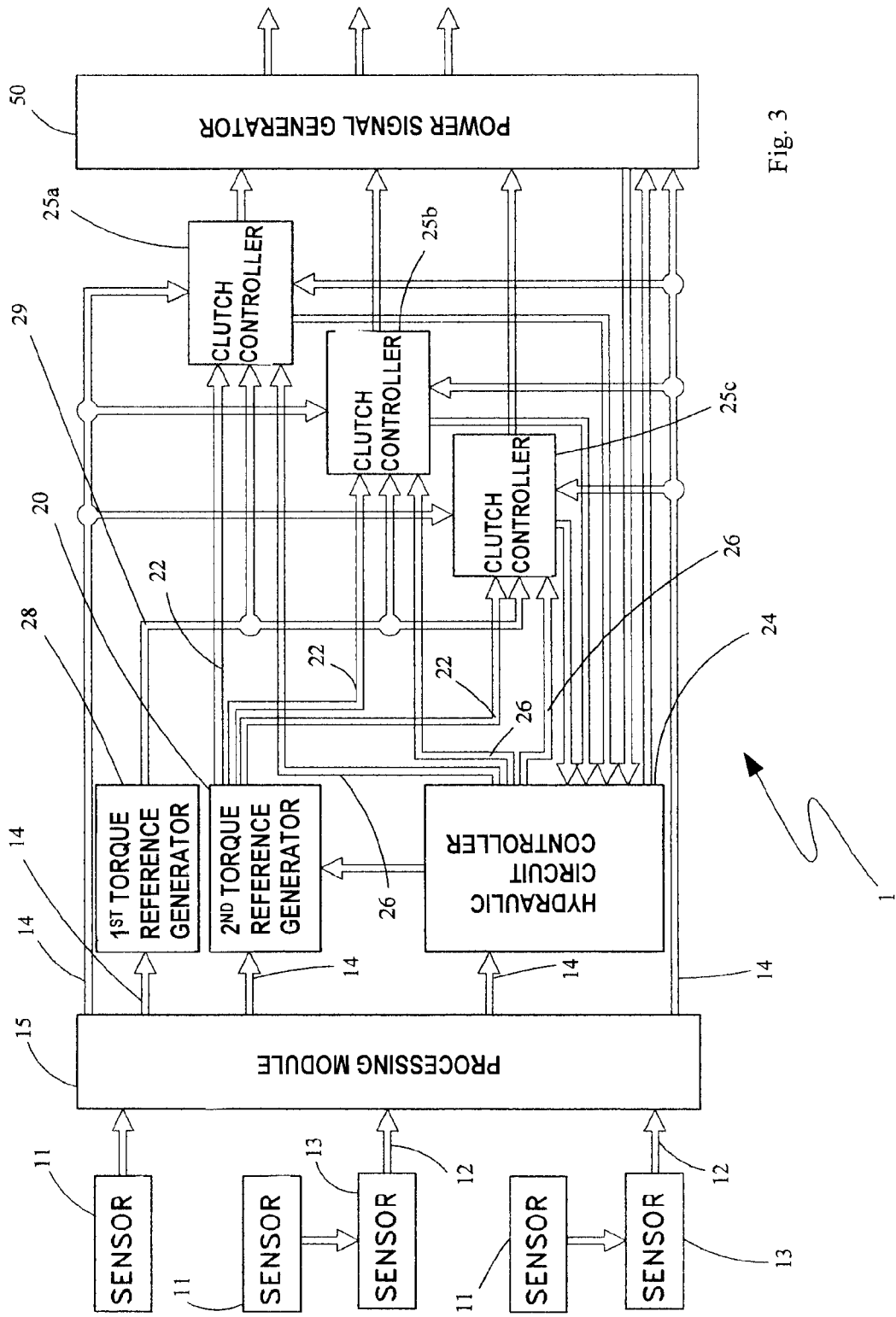
Figure 4:
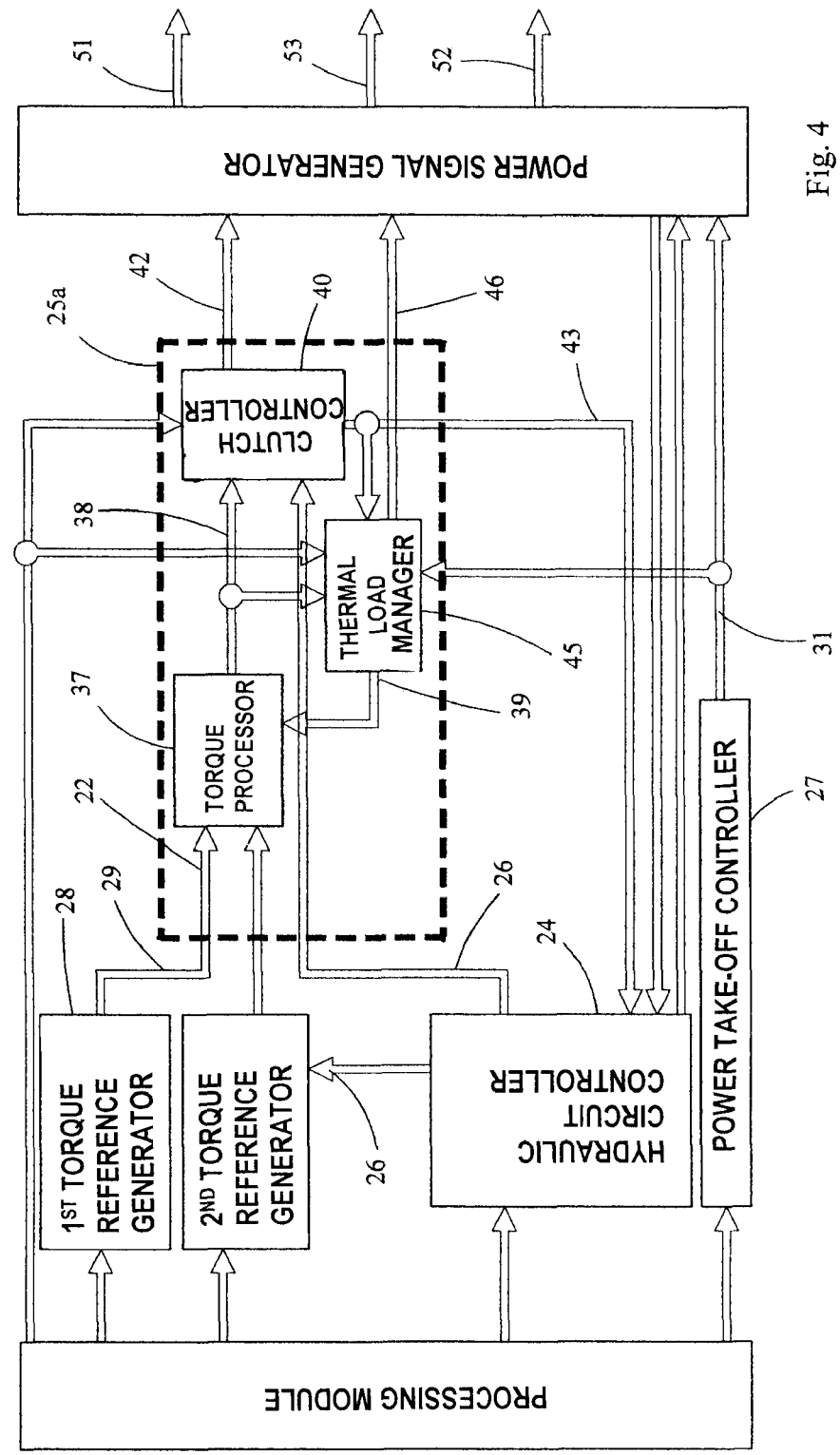
Figure 5:
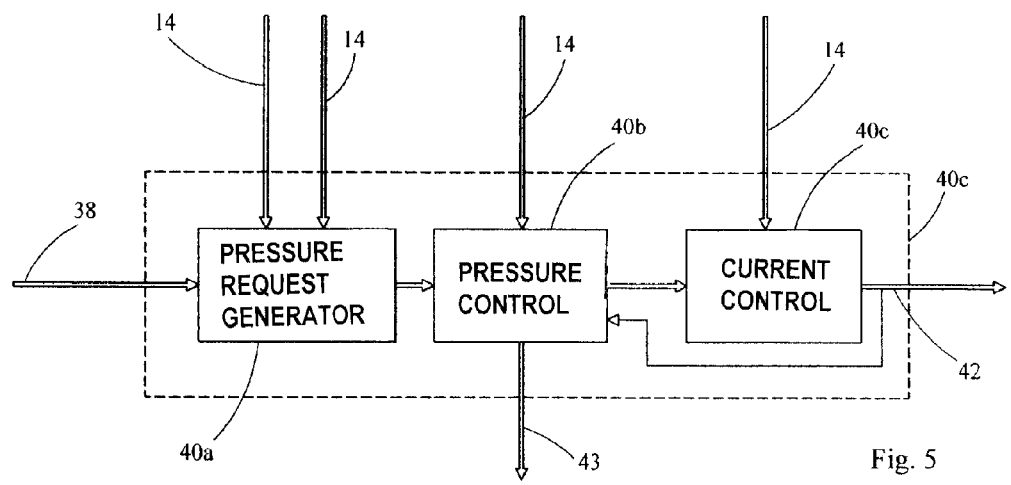
Figure 6:
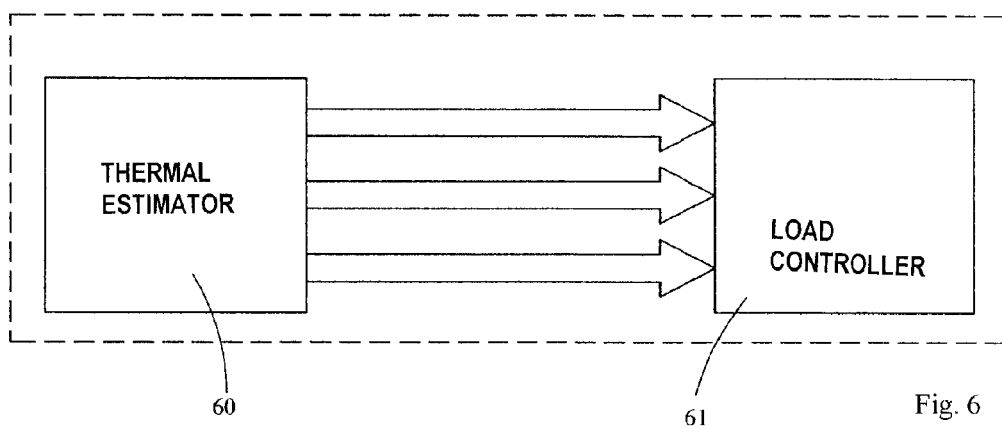
Figure 7:
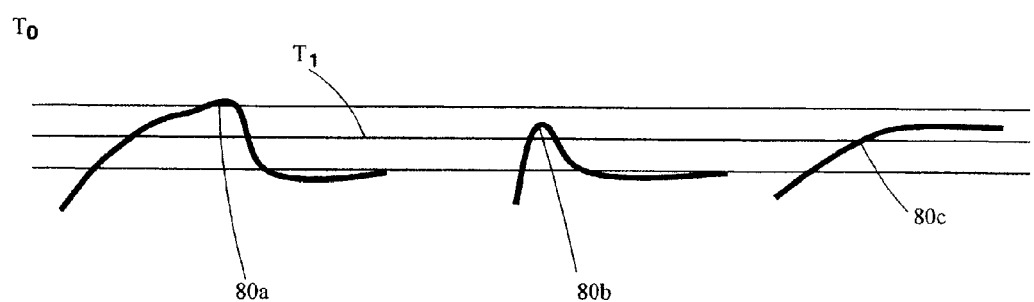
Figure 8:
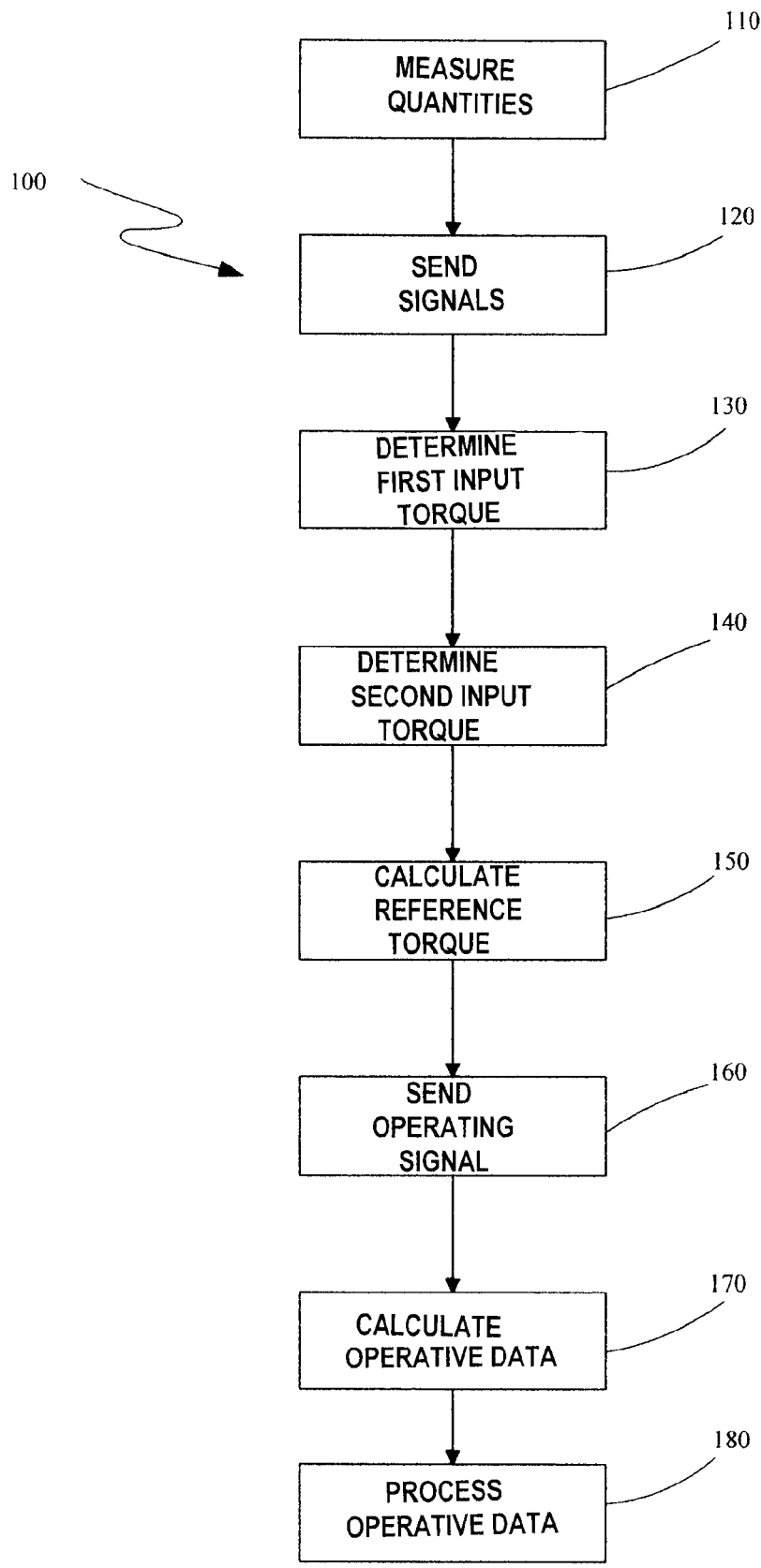

Those and other advantages of the invention will emerge more clearly from the following detailed description of some embodiments thereof illustrated by way of non-limiting example with reference to the appended drawings in which:

FIG. 1 is a view in lateral section of a clutch controlled by means of the control system of the present invention, FIG. 2 is a schematic diagram of a transmission comprising three clutches of the type shown in FIG. 1, FIG. 3 is a functional schematic diagram of the control system of the present invention, FIG. 4 is a functional schematic diagram of a detail of the control system of FIG. 2, FIGS. 5 and 6 are two functional schematic diagrams of two respective details of the diagram of FIG. 3, FIG. 7 is a diagram of the operation of the clutch of FIG. 2, FIG. 8 is a logic diagram which represents a control method according to the present invention.

Referring to the appended drawings, 1 generally indicates a control system for a transmission 2 of an agricultural vehicle or an industrial off-highway vehicle (not shown) comprising a primary motor 5 and a clutch unit 3 interposed between the motor 5 and a gear-box 4.

The primary motor 5 of the vehicle is of the endothermic or electrical type or of some other type.

According to other variants of the invention (not shown), the clutch unit is placed downstream of the gear-box.

In general, for the purposes of the present invention, the clutch unit may be positioned along the transmission, at any point between the motor and the driving wheels.

The clutch unit 3 comprises a first shaft 6, for connection between the motor 5 and the gear-box 4, and a second shaft 7, namely a layshaft, parallel with the first shaft 6. Arranged in succession along the shaft 6, from the motor 5 to the gear-box 4, are a first gearwheel 6a, a first clutch 10a, which are dedicated to high speeds, a second gearwheel 6b and a third gearwheel 6c.

Arranged in succession along the layshaft 7, from the motor 5 to the gear-box 4, are a fourth gearwheel 7a, meshing with the first gearwheel 6a, a fifth wheel 7b, meshing with the second gearwheel 6b, a second clutch 10b, which are dedicated to low speeds, a third clutch 10c dedicated to reverse and a sixth gearwheel 7c meshing on an intermediate wheel 8, which in turn meshes on the third gearwheel 6c.

The operation of the clutch unit 3 for high speeds, low speeds and reverse, respectively, is as follows:

with the second and third clutches 10b,c open, the first clutch 10a can be used to transmit motion from the motor 5 to the gear-box 4 by way of the first shaft 6. The speeds are set by means of the gear-box 4;

with the first and third clutches 10a,c open, the second clutch 10b can be used to transmit motion from the motor 5 to the gear-box 4 by way of the toothed couplings between the wheels 6a, 7a and between the wheels 6b, 7b. The speeds set by means of the gear-box 4 are reduced in accordance with the transmission ratios defined by the toothed couplings between the wheels 6a, 7a and between the wheels 6b, 7b;

with the first and second clutches 10a,b open, the third clutch 10c can be used to transmit motion from the motor 5 to the gear-box 4 by way of the toothed couplings between the wheels 6c, 8 and between the wheels 8, 7c.

Owing to the presence of the intermediate wheel 8, the directions of rotation of the motor 5 and the gear-box 4 are reversed.

The three clutches 10a,b,c are of the multi-plate type, being provided with respective packs of plates 21a,b,c interposed between respective pluralities of counter-plates 71a,b,c and subjected to a flow of lubricating and cooling oil. The clutches 10a,b,c have the same structure and operation which are known per se and which are in any case based geometrically on the section shown in FIG. 1.

According to other variants of the invention, the present control system is in any case adaptable also to other transmissions, for example having a number of clutches other than three, or having clutches of a different type, such as single-plate clutches.

The appended FIGS. 2 and 3 show the control system 1 by means of two respective functional schematic diagrams in which the components of the control system 1 are represented by respective blocks and the quantities exchanged between the components, in the form of electrical signals, are represented by arrows, as described in detail hereinafter.

The control system 1 comprises a plurality of sensors 11 suitable for measuring a plurality of characteristic quantities of the transmission, including the analogue quantities of the input and output speed of the clutch, the temperature and the pressure of the control and lubricating oil and the discrete quantities indicating the state of the transmission, such as the position of the vehicle direction lever. That plurality of quantities is converted into a plurality of raw digital signals 12 as input into the control system 1, which signals are generated inside the sensors themselves as regards the discrete quantities or in respective converters 13 as regards the analogue quantities.

The sensors and converters are connected to an input signal processing module 15 which receives the digital signals 12 and processes them, eliminating the noise from the discrete signals and filtering the digital signals, converting them into operative input quantities 14 to be transmitted within the control system 1 by means of respective signals.

The control system 1 comprises a controller 24 of the main hydraulic circuit, the main hydraulic circuit being that used to actuate the clutches 10a,b,c. The controller 24 of the main hydraulic circuit receives the operative input signals 14 from the input signal processor 15 and three signals indicating the state of the clutches 10a,b,c from the clutch controllers 25a,b,c, respectively. The controller 24 of the main hydraulic circuit processes the signals 14 and 43, identifying the condition of travel of the vehicle and of the clutch and generating enabling signals 26, which are transmitted to the three respective clutch controllers 25a,b,c in order to enable or disable the respective clutches 10a,b,c.

The control system 1 comprises a power take-off controller 27 which receives the operative input signals 14 relating to a power take-off (not shown) of the agricultural vehicle, and processes them to generate a reference signal 31 which can be used to control the power take-off and which is transmitted to the three clutch controllers 25a,b,c, as well as to a device 50 for generating output power signals which receives the reference signal 31 and processes it to generate a power signal 52 by means of which the hydraulic control actuation of the power take-off of the vehicle is controlled, in accordance with known methodologies which are not subject-matter of the present invention.

The control system 1 comprises a first torque reference generator 28 which receives the operative input signals 14 and processes them, identifying the position of a clutch pedal (not shown) and determining a first input torque 29 as a function of the position of the pedal. Therefore, the torque reference generated by the torque generator is represented by a reference signal managed by the control system 1 and corresponding to a predetermined torque value generated on the basis of predetermined parameters or conditions.

The first torque reference generator 28 is also connected electrically—or, to be more precise, functionally—to the three respective clutch controllers 25a,b,c to supply a signal proportional to the first input torque 29.

The control system 1 also comprises a second torque reference generator 20 formed by an automatic ramp generator connected to the input signal processor 15 from which it receives the operative input signals 14 and processes them to identify the condition of travel of the vehicle and the commands transmitted by the user and to generate, as a function thereof, a second input torque 22 generated on the basis of predefined time-torque maps.

The second torque reference generator 20 is connected functionally to the three respective clutch controllers 25a,b,c to supply a signal proportional to the second input torque 22.

The clutch controllers 25a,b,c have the same structure and operation and consequently only the clutch controller 25a for controlling the clutch 10a will be described in detail hereinafter.

The clutch controller 25a receives the signals of the first input torque 29 and of the second input torque 22 and one of the enabling signals 26 and processes them to generate a voltage reference 42 for supplying a proportional valve (not shown) of the hydraulic actuating circuit of the clutch 10a. The clutch controller is connected to the device 50 for the generation of output power signals, which receives the voltage reference 42 and processes it to generate a power signal 51 by means of which a proportional valve of the hydraulic actuating circuit is actuated, which valve controls the movement of the plates and the pressure applied to the plates 21a of the clutch 10a.

The clutch controller 25a comprises:
a torque processor 37 connected to the first torque reference generator 28, from which it receives the first input torque 29, and to the second torque reference generator 20, from which it receives the second input torque 22, in order to calculate a reference torque 38,
a controller 40 of the clutch 10a, which is connected to the clutch to supply an operating signal represented by the voltage reference 42,
a device 45 for managing the thermal load of the clutch, which device is connected to the input signal processor 15 to receive the operative input signals 14 and to the clutch controller 40 to receive the reference torque 38 in order to calculate an operative datum on which depends the thermal power dissipated in the clutch 10a in slipping conditions of the plates 21a,b,c relative to the respective counter-plates 71a,b,c. The control system 1 processes that operative datum to operate the transmission of the agricultural vehicle in such a manner as to limit the increase in temperature on the plates caused by the thermal power dissipated in the clutch 10a, as will be explained in more detail hereinafter for three different variants of the present invention, in which the operative datum is, respectively, a datum in respect of torque, a datum in respect of clutch speed and a datum in respect of the oil flow rate and temperature in the hydraulic lubrication and cooling circuit.

According to a first variant of the present invention, the torque processor 37 receives, in addition to the first input torque 29 and the second input torque 22, also a third input torque 39 calculated by the thermal load managing device 45, and calculates the reference torque 38 as the lowest value of the first, second and third input torques 29, 22, 39.

According to other variants, the torque processor 37 receives only the first input torque 29 and the second input torque 22 and calculates the reference torque 38 as the lower value of the first and second input torques 29, 22. The controller 40 is connected to the operative input signals 14, in particular receiving through those signals the digital quantities which represent the input and output speeds of the clutch, the temperature and pressure of the actuating and lubricating oil and the current circulating in the solenoid of the proportional valve of the hydraulic actuating circuit of the clutch 10a. The controller 40 is formed by a pressure request generator 40a, a pressure control 40b and a current control 40c, which are arranged in series, respectively. The pressure request generator 40a receives the reference torque 38, the input and output speeds of the clutch and the temperature of the actuating and lubricating oil and processes them to generate a reference pressure, transmitted to the pressure control 40b which compares it with the measured pressure of the actuating oil to generate a current reference. The current control 40c receives the current reference and compares it with the current measured in the solenoid of the proportional valve of the hydraulic actuating circuit of the clutch 10a to generate the voltage reference 42.

The controller 40 also generates a state signal 43, identifying the state of the clutch 10a, which is sent both to the controller 24 of the main hydraulic circuit in order to calculate the enabling signal 26, and to the thermal load managing device 45. The state signal 43 is generated as output from the pressure control 40b, also taking into account the signals generated by the pressure request generator 40a and by the current control 40c.

The thermal load managing device 45, in all of the variants of the present invention, receives the same signals as the controller, that is to say, the operative input signals 14 and the reference torque 38, as well as the signals 31 and 43 identifying the state of the power take-off and the clutch and uses them to monitor the thermal state of the clutch. If, during that monitoring activity, the thermal load managing device 45 identifies an increase in the power dissipated in the plate packs 21a,b,c in the slipping condition, with attainment of the threshold power, equal to the power carried off by the lubricating oil, and consequent raising of the temperature of the plates, the thermal load managing device 45 intervenes to modify the balance between power dissipated by the clutch and power carried off by the lubricant in the plates, operating principally in accordance with one or more of the following strategies:

saturation of the torque transmitted by the plates,
limitation of the speed of rotation of the clutch,
increase in the power removed by the lubricating oil.

The purpose of the thermal load managing device 45 is to control the equilibrium between the power dissipated by the clutch in slipping conditions and the power carried off by the flow of lubricating oil which passes through the clutch pack, in such a manner as to regulate the temperature of the plates in accordance with one or more predefined threshold values $T_0$, $T_1$ of the friction material used to manufacture the clutch plates, above which values the efficiency characteristics of the clutch deteriorate to the extent that it may be damaged.

That purpose can be achieved in accordance with various strategies shown graphically in FIG. 6.

According to a first intervention strategy 80a, the thermal load managing device 45 is operated when the temperature of the plates exceeds a predefined maximum value $T_0$, for example 250° C. According to a second intervention strategy 80b, the thermal load managing device 45 is operated when the temperature of the plates exceeds a value $T_1$ within the predefined threshold range, for example 245° C. or at any rate slightly lower than that of the first strategy 80a, with a growth gradient greater than a predefined threshold, for example 2° C./s. The use of two thresholds of temperature and gradient in the second strategy 80b makes it possible to identify cases such as that of the curve 80c in which it is not necessary for the thermal load managing device 45 to intervene when the temperature threshold is exceeded because the temperature of the plates is in any case close to reaching an equilibrium value which is not critical for performance or damage to the material of the clutch plates.

The thermal load managing device 45 comprises a thermal estimator 60 which implements the known heat exchange equations in forced convection regime in order to calculate the temperature of the plates, the power dissipated in the plates and the power removed by the lubricating oil as a function of the thermal capacity and the thermal conductivity of the plates and the flow rate of the lubricating oil.

The quantities calculated by the thermal estimator 60 are sent to a load controller 61 which processes them to generate an operative datum which can be used by the control system 1 to limit the thermal power dissipated in the clutch 10a or to increase the power removed by the lubricating oil.

In all of the variants of the present invention, the thermal load managing device 45 intervenes to cause the relation A, given hereinafter, to be proved:

$$P_{clutch} \leq P_{lube} \tag{A}$$

in which the expression B:

$$P_{clutch} = \tau_{clutch} \cdot \omega_{slipping} \tag{B}$$

represents the power dissipated in the clutch plates as a function of the torque transmitted by the clutch $\tau_{clutch}$ and the slipping speed of the clutch $\overline{\omega}_{slipping}$ and $P_{lube}$ represents the thermal power removed by the lubricating oil. Substituting the expression B in the relation A, this relation is made explicit in the following relation C:

$$\tau_{clutch} \cdot \omega_{slipping} \leq P_{lube} \tag{C}$$

In accordance with the first variant of the invention, according to which the torque processor 37 receives a first, a second and a third input torque 29, 22, 39 in order to calculate a reference torque 38 as the lowest value of the above-mentioned three torques, the thermal load managing device 45 intervenes on the torque transmitted by the clutch, limiting it to a saturation torque $\tau_{SAT}$, calculated in accordance with the relation D, derived from the relation C, substituting $\tau_{sat}$ for $\tau_{clutch}$:

$$\tau_{sat} \leq \frac{P_{lube}}{\omega_{slipping}}. \tag{D}$$

According to a second variant of the invention, the thermal load managing device 45 intervenes on the slipping speed, limiting it to a saturation speed $\overline{\omega}_{sat}$, calculated according to relation E, derived from relation C, substituting $\overline{\omega}_{sat}$ for $\overline{\omega}_{slipping}$:

$$\omega_{sat} \leq \frac{P_{lube}}{\tau_{clutch}} \tag{E}$$

The slipping speed can be controlled by acting on the input speed of the clutch, that speed being typically linked to the motor speed. This type of intervention is therefore possible only if the control system 1 can intervene on the motor and if the variations required of the motor are compatible with its torque curve.

According to a third variant of the invention, the thermal load managing device 45 intervenes on the thermal power $P_{lube}$ removed by the lubricating oil, which can be represented in accordance with the following relation F:

$$P_{lube} = f(\theta_{plate}, \theta_{lube}, q_{lube}, TC_{lube}) \quad (F)$$

wherein:

$\theta_{plate}$ is the temperature of the counter-plates (71a,b,c) of the clutch 10a, $\theta_{lube}$ is the temperature of the lubricating oil, $q_{lube}$ is the flow rate of the lubricating oil through the clutch and $TC_{lube}$ is the thermal conductance of the flow of lubricating oil.

In the relation F, the flow rate $q_{lube}$ can be made explicit in accordance with the following relation G, substituting $P_{lube}$ by the power dissipated by the clutch $P_{clutch}$:

$$q_{lube} = f(\theta_{plate}, \theta_{lube}, P_{clutch}, TC_{lube}) \quad (G)$$

According to the present variant, the thermal load managing device 45 can therefore intervene on the flow rate of the lubricating oil, determining the minimum flow rate of lubricant which must be sent to the clutch in order to prove the relation A.

Both in the second and in the third variant described above, the thermal load managing device 45 generates a reference signal 46 corresponding to a datum of slipping speed and a datum of lubricating oil flow rate, respectively, which is transmitted to the device 50 for the generation of output power signals which receives the reference signal 46 and processes it to generate a power signal 53 by means of which the clutch input speed or the lubricating oil flow rate, respectively, is controlled.

Other variants of the present invention provide for a combination of the three variants described above.

For example, in the case of the implementation of the third variant, when the lubricating oil flow rate reaches the maximum possible value, or when the hydraulic circuit of the lubricating oil is in a condition of failure, it is possible to provide for a switch-over to operation of the thermal load managing device 45 according to the first variant (control of the saturation torque) or according to the second variant (control of the clutch slipping speed).

The control system 1 permits efficient control of the thermal power generated by the clutch plates through friction, enabling the object of the present invention to be achieved.

However, other control systems may nevertheless achieve the same object, provided they are implemented in accordance with a method 100 (FIG. 7), for a transmission of an agricultural vehicle including a clutch 10a.

The control method 100 comprises:

a first phase 110 of measuring a plurality of characteristic quantities 14 of the transmission and the vehicle, including the analogue quantities of the input and output speed of the clutch 10a, the temperature and pressure of the lubricating and actuating oil and the discrete quantities indicating the state of the transmission, such as the position of the vehicle direction lever, the motor speed, the temperature of the lubricating and actuating oil, the pressure on the clutch plates and the clutch output speed, a second phase 120 of sending a plurality of electrical signals proportional to the quantities 14 to at least one controller 40 of a clutch 10a. According to a variant of the present phase 120, the quantities 14 are sent to three controllers 40 for three respective clutches 10a,b,c, a third phase 130 of determining a first input torque 29 as a function of the position of a pedal of the clutch 10a, a fourth phase 140 of determining a second input torque 22 as a function of predefined time-torque maps. According to a variant of the present phase 140, those predefined maps are modified as a function of the output speed of the clutch 10a, a fifth phase 150 of calculating a reference torque 38 to be supplied to the controller 40, as a function of the first and second input torques 29, 22, a sixth phase 160 of supplying a signal 42 for operating the clutch 10a, by means of the controller 40. The signal 42 contains a voltage reference calculated in the controller 40 as a function of the reference torque 38.

a seventh phase 170 of calculating one or more operative data 39, 46 dependent on the thermal power dissipated in the clutch 10a as a function of the quantities 14, of the reference torque 38 and of the state of the power take-off and an eighth phase 180 of processing the operative 39, 46 in order to operate the transmission in such a manner as to limit the temperature in the clutch 10a.

According to a first variant of the control method 100, the phase 170 consists in determining a third input torque 39 as a function of the thermal power carried off by the flow of the lubricating oil and the phase 180 consists in calculating the reference torque 38 as the lowest value of the first, second and third input torques 29, 22 and 39.

According to a second variant of the control method 100, the phase 170 consists in calculating an input speed of the clutch 10a as a function of a maximum value of the thermal power carried off by the flow of the lubricating oil and the phase 180 consists in calculating a reference speed signal 46 in order to supply a control signal 53 to the transmission to set the input speed of the clutch 10a.

According to a third variant of the control method 100, the phase 170 consists in calculating a flow rate of the oil in the hydraulic lubrication circuit of the clutch 10a as a function of a maximum value of the thermal power dissipated in the clutch 10a and the phase 180 consists in calculating a reference flow rate signal 46 in order to supply a control signal 53 to the hydraulic lubrication oil circuit to set the oil flow rate.

The control method 100 can be carried out by means of a computer program comprising instructions which, when loaded into a computer memory, are suitable for performing all of the phases of the method 100.

That program can likewise be represented by FIGS. 3 and 4 in which the blocks are modules of the program and the arrows represent the exchange of data between those program modules.

The invention claimed is:

1. A control system for a transmission of an agricultural vehicle or an industrial off-highway vehicle, the agricultural or industrial off-highway vehicle including at least one clutch, the control system comprising:

a controller of the at least one clutch, connected thereto to supply a reference signal for operating the at least one clutch, a plurality of sensors for measuring a plurality of characteristic quantities of the transmission and connected at least to the controller to supply a plurality of signals proportional to the characteristic quantities, the characteristic quantities comprising quantities proportional to a power dissipated by the at least one clutch in slipping conditions and quantities proportional to a power carried off by a flow of a lubricating liquid of the at least one clutch, a torque processor for calculating a reference torque and connected to the controller to supply to the controller a signal proportional to the reference torque, a thermal load managing device for receiving at least some of the plurality of characteristic quantities and for receiving the reference torque in order to calculate at least one operative datum on which a thermal power exchanged in the at least one clutch is dependent, wherein the control system is suitable for processing the operative datum in order to operate the transmission so as to limit a temperature in the at least one clutch by modifying an energy balance between the power dissipated by the at least one clutch and the power carried off by the flow of the lubricating liquid by a reduction in the power dissipated by the at least one clutch and/or an increase in the power carried off by the flow of the lubricating liquid, wherein the thermal load managing device calculates a lubricating liquid flow rate in a hydraulic lubrication circuit of the at least one clutch as a function comprising the thermal power dissipated by the at least one clutch and the thermal conductance of the flow of the lubricating liquid, the thermal load managing device is connected to a power signal generating device to supply a signal proportional to the lubricating liquid flow rate, the power signal generating device is active on the hydraulic lubrication circuit to set the lubricating liquid flow rate.

2. The control system according to claim 1, wherein the quantities proportional to a power dissipated by the at least one clutch in slipping conditions comprise a speed of rotation of the at least one clutch and/or a torque applied to the at least one clutch and the quantities proportional to a power carried off by the flow of the lubricating liquid of the at least one clutch comprise a flow rate and/or a temperature of the lubricating liquid supplied to the at least one clutch.

3. The control system according to claim 2, wherein the temperature of the lubricating liquid supplied to the at least one clutch is limited by reducing the power dissipated by the at least one clutch by a reduction in the speed of rotation of the at least one clutch and/or the torque applied to the at least one clutch.

4. The control system according to claim 2, wherein the temperature of the lubricating liquid supplied to the at least one clutch is limited by increasing the flow rate of the lubricating liquid supplied to the at least one clutch.

5. The control system according to claim 1, further comprising:

a first torque reference generator for determining a first input torque as a function of the position of a clutch pedal of the vehicle, the first torque reference generator is connected to the processor to supply a signal proportional to the first input torque, a second torque value generator for determining a second input torque as a function of predefined torque profiles and of at least one speed of the transmission, the second generator is connected to the processor to supply a signal proportional to the second input torque.

6. The control system according to claim 5, wherein the thermal load managing device is for determining a third input torque as a function of a temperature value of the lubricating liquid supplied to the at least one clutch, and wherein the thermal load managing device is connected to the processor to supply a signal proportional to the third input torque.

7. The control system according to claim 6, wherein the reference torque determined in the torque processor is the lowest torque of the first input torque, the second input torque, and the third input torque.

8. The control system according to claim 1, wherein the thermal load managing device further calculates an input speed of the at least one clutch as the function, the thermal load managing device is further connected to the power signal generating device to supply a signal proportional to the input speed of the at least one clutch, the power signal generating device is further active on the transmission to set the input speed in the at least one clutch.

9. A control method for a transmission of an agricultural vehicle or an industrial off-highway vehicle, the agricultural or industrial off-highway vehicle including a clutch, the method comprising:

measuring, by a processor, a plurality of characteristic quantities of the transmission, the characteristic quantities comprising quantities proportional to a power dissipated by the clutch in slipping conditions and quantities proportional to a power carried off by a flow of a lubricating liquid of the clutch, sending, by a power signal generator, a plurality of electrical signals proportional to the characteristic quantities to at least one controller of the clutch, calculating, by a processor, a reference torque to be supplied as input to the at least one controller, supplying, by a power signal generator, a signal for operating the clutch, as an output of the at least one controller, calculating, by a processor, at least one operative datum on which a thermal power exchanged in the clutch is dependent as a function of at least some of the plurality of characteristic quantities of the transmission and of the reference torque, and processing, by a processor, the at least one operative datum in order to operate the transmission so as to limit a temperature in the clutch modifying an energy balance between the power dissipated by the clutch and the power carried off by the flow of the lubricating liquid by a reduction in the power dissipated by the clutch and/or an increase in the power carried off by the flow of the lubricating liquid, wherein calculating the at least one operative datum includes a phase of calculating a lubricating liquid flow rate in a hydraulic lubrication circuit of the clutch as a function comprising the thermal power dissipated by the clutch and a thermal conductance of the flow of the lubricating liquid, and wherein processing the at least one operative datum includes a phase of supplying a control signal to the hydraulic lubrication circuit to set the lubricating liquid flow rate.

10. The control system according to claim 9, wherein the quantities proportional to a power dissipated by the clutch in slipping conditions comprise a speed of rotation of the clutch and/or a torque applied to the clutch and the quantities proportional to a power carried off by the flow of the lubricating liquid of the clutch comprise a flow rate and/or a temperature of the lubricating liquid supplied to the clutch.

11. The control system according to claim 10, wherein the temperature of the lubricating liquid supplied to the clutch is limited by reducing the power dissipated by the clutch by a reduction in the speed of rotation of the clutch and/or the torque applied to the clutch.

12. The control system according to claim 10, wherein the temperature of the lubricating liquid supplied to the clutch is limited by increasing the flow rate of the lubricating liquid supplied to the clutch.

13. The control system according to claim 9, further comprising the phases of:
   determining, by a processor, a first input torque as a function of the position of a clutch pedal of the vehicle, and
   determining, by a processor, a second input torque as a function of predefined torque profiles and of at least one speed of the transmission,
   wherein calculating the at least one operative datum includes a phase of determining a third input torque as a function of the thermal power exchanged in the clutch, and wherein processing the operative datum includes a phase of calculating the reference torque as a lowest value of the first input torque, the second input torque, and the third input torque.

14. The control system according to claim 9, wherein calculating the at least one operative datum further includes a phase of calculating an input speed of the clutch as the function, and wherein processing the operative datum further includes a phase of supplying a control signal to the transmission to set the input speed of the clutch.

* * * * *